(12) United States Patent
Shim

(10) Patent No.: US 8,856,503 B2
(45) Date of Patent: Oct. 7, 2014

(54) COMPUTING SYSTEM, BOOTING METHOD AND CODE/DATA PINNING METHOD THEREOF

(75) Inventor: Hojun Shim, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 724 days.

(21) Appl. No.: 12/656,715

(22) Filed: Feb. 16, 2010

(65) Prior Publication Data

US 2010/0217966 A1  Aug. 26, 2010

(30) Foreign Application Priority Data

Feb. 23, 2009 (KR) .................. 10-2009-0014949

(51) Int. Cl.
*G06F 15/177* (2006.01)
*G06F 9/44* (2006.01)

(52) U.S. Cl.
CPC .................. *G06F 9/4401* (2013.01)
USPC ............................................................ 713/2

(58) Field of Classification Search
CPC ................................ G06F 15/177; G11C 7/20
USPC ............................................................ 713/2
See application file for complete search history.

(56) References Cited

U.S. PATENT DOCUMENTS

| | | | | |
|---|---|---|---|---|
| 5,778,443 | A * | 7/1998 | Swanberg et al. | 711/162 |
| 7,082,495 | B2 * | 7/2006 | DeWhitt et al. | 711/113 |
| 7,716,411 | B2 * | 5/2010 | Panabaker et al. | 711/101 |
| 8,065,563 | B2 * | 11/2011 | Lai | 714/36 |
| 2003/0028708 | A1 | 2/2003 | Moran | |
| 2006/0064684 | A1 * | 3/2006 | Royer et al. | 717/168 |
| 2008/0270811 | A1 | 10/2008 | Chow et al. | |
| 2009/0094405 | A1 | 4/2009 | Kim et al. | |

FOREIGN PATENT DOCUMENTS

| | | |
|---|---|---|
| JP | 2003-114826 | 4/2003 |
| KR | 10-2003-0014127 | 2/2003 |
| KR | 10-0819061 B1 | 3/2008 |
| KR | 10-2008-0057688 | 6/2008 |
| KR | 10-2008-0096071 | 10/2008 |

* cited by examiner

*Primary Examiner* — Kim Huynh
*Assistant Examiner* — Eric Chang
(74) *Attorney, Agent, or Firm* — Harness, Dickey & Pierce, P.L.C.

(57) ABSTRACT

The booting method of a computing system includes determining whether boot data of an operating system is pinned to a main memory, reading boot data from a storage device to pin the read boot data to the main memory when relocation of the pinned boot data is required, and performing a booting operation using the pinned boot data.

15 Claims, 8 Drawing Sheets

COMPUTING SYSTEM, BOOTING METHOD AND CODE/DATA PINNING METHOD THEREOF

CROSS-REFERENCE TO RELATED APPLICATIONS

A claim of priority under 35 U.S.C §119 is made to Korean Patent Application No. 10-2009-0014949 filed Feb. 23, 2009, the entirety of which is incorporated herein by reference.

BACKGROUND

1. Technical Field

Example embodiments relate to a computing system and booting and code data pinning methods thereof.

2. Description of Related Art

Recently, applications of storage devices such as volatile memories and non-volatile memories have been propagated into mobile devices such as MP3 players, PMP, cellular phones, notebook computers, PDA, and the like. Such mobile devices generally require the storage devices to have a large volume in order to provide various functions, such as reproducing a moving picture.

SUMMARY

According to example embodiments, a booting method of a computing system includes determining whether boot data of an operating system is pinned to a main memory, reading boot data from a storage device to pin the read boot data to the main memory when relocation of the pinned boot data is required, and performing a booting operation using the pinned boot data.

According to example embodiments, a code data pinning method of a computing system includes reading code data stored in a storage device, determining whether the read code data is relocatable, and selectively pinning the read code data to a main memory based on an operating speed and power consumption, if the read code data is determined to be relocatable.

According to example embodiments, a computing system includes a Central Processing Unit (CPU), a north bridge, a main memory, a south bridge and a storage device. The north bridge is configured to connect the CPU with one or more devices directly accessing the CPU. The main memory is connected with the north bridge and is configured to store data used for an operation of the CPU. The south bridge is connected with the north bridge and is configured to connect with one or more device indirectly accessing the CPU. The storage device is connected with the south bridge and is configured to store user data and code data. The main memory includes a non-volatile memory to which the code data stored in the storage device is pinned and to which the pinned code data is executed in place of the code data stored in the storage device.

BRIEF DESCRIPTION OF THE DRAWINGS

The above and other objects and features of example embodiments will become apparent from the following description with reference to the following figures, wherein like reference numerals refer to like parts throughout the various figures unless otherwise specified, and wherein.

DETAILED DESCRIPTION

Figure 1:
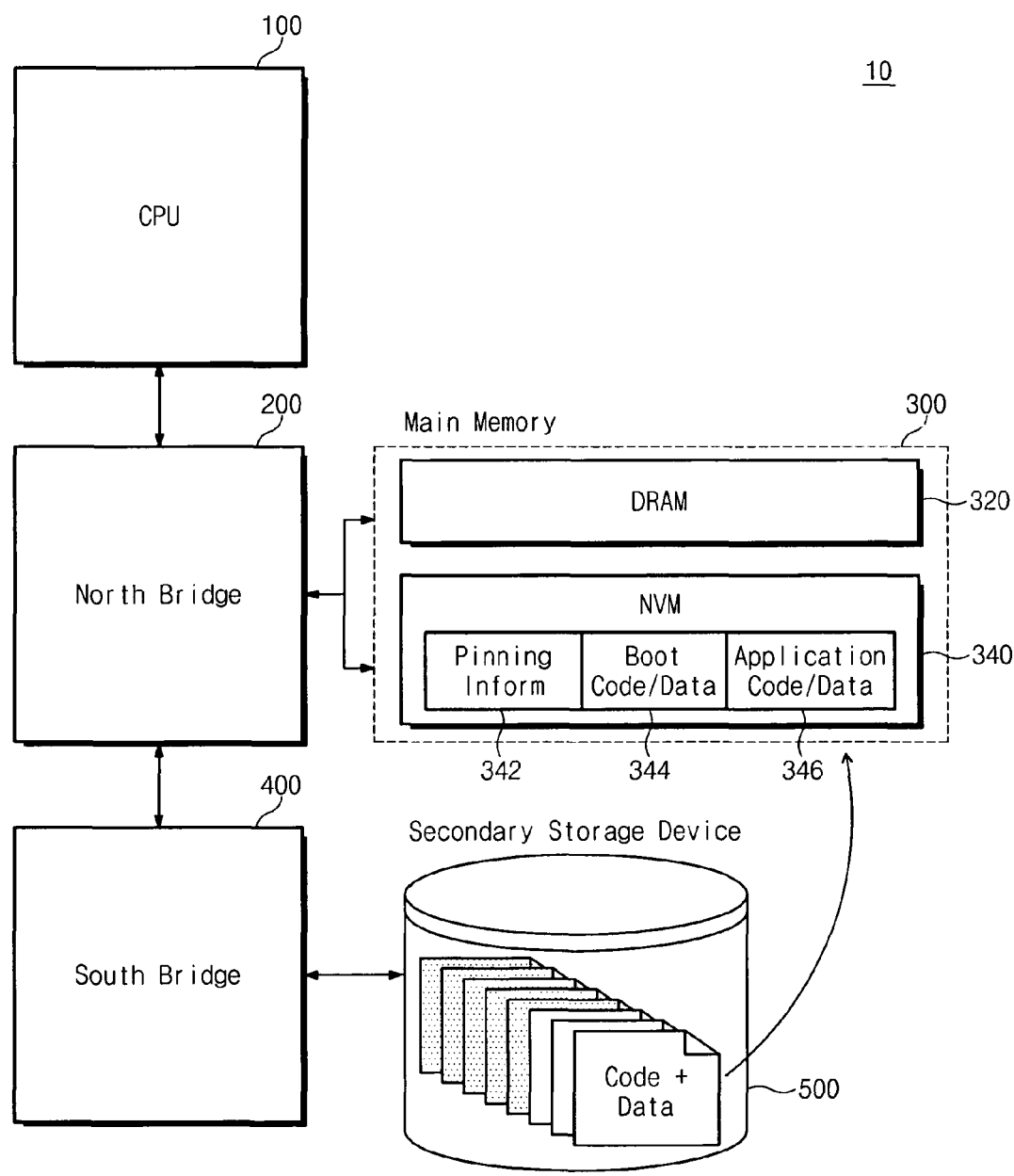
FIG. 1 is a diagram showing a computing system according to example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of One or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures. The figures are intended to depict example embodiments and should not be interpreted to limit the intended scope of the claims. The accompanying figures are not to be considered as drawn to scale unless explicitly noted.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof. In this specification, the term "and/or" picks out each individual item as well as all combinations of them.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Now, in order to more specifically describe example embodiments, example embodiments will be described in detail with reference to the attached drawings. However, example embodiments are not limited to the embodiments described herein, but may be embodied in various forms.

When it is determined that a detailed description related to a related known function or configuration may make the purpose of example embodiments unnecessarily ambiguous, the detailed description thereof will be omitted. Also, terms used herein are defined to appropriately describe example embodiments and thus may be changed depending on a user, the intent of an operator, or a custom. Accordingly, the terms must be defined based on the following overall description within this specification.

A computing system according to example embodiments may be realized to pin code/data to a main memory which has a non-volatile XIP (eXecute In-Place) memory. The main memory may be a random access memory. With this architecture, the computing system may use code/data pinned in the non-volatile XIP memory at an operation so that a booting speed is increased and power consumption is reduced.

FIG. 1 is a diagram showing a computing system according to example embodiments. Referring to FIG. 1, a computing system 10 may include CPU 100, a north bridge 200, a main memory 300, a south bridge 400, and a storage device 500. The main memory 300 may include a non-volatile memory 340 to which XIP boot code/data of an operating system and code/data of an application program are pinned. The term XIP refers to allowing the code or program to be executed in place of a memory. The term pinned refers to the Operating System ("OS") boot code/data and application code/data being loaded from the storage device 500.

The CPU 100 may control an overall operation of the computing system 100. The north bridge 200 may be connected with the CPU 100 and be a hardware or software module for connecting constituent elements or peripheral devices requiring high transfer speed and system performance.

The main memory 300 may include Dynamic Random Access Memory ("DRAM") 320 for storing data used for an operation of the CPU 100 and a non-volatile memory 340 for pinning OS boot code/data and application code/data. The non-volatile memory 340 may be a random access memory. For example, the non-volatile memory 340 may be Phase-change Random Access Memory ("PRAM"). The non-volatile memory 340 may include a pinning information area 342, a boot code/data area 344, and an application code/data area 346.

The pinning information area 342 may be an area for informing XIP information pinned to the non-volatile memory 340. For example, the pinning information area 342 may store information indicating whether any OS boot code/data is pinned to an address corresponding to the boot code/data area 344 or whether any application code/data is pinned to an address corresponding to the application code/data area 346. For example, the pinning information area 342 may store relocation information of OS boot code/data or application code/data, stored in the storage device 500, into the non-volatile memory 340.

The boot code/data area 344 may be an area to which OS boot code or data stored in the storage device 500 is pinned. The application code/data area 346 may be an area to which application program code or data stored in the storage device 500 is pinned.

The main memory 300 may be realized by a hybrid main memory which is formed of PRAM and DRAM. The PRAM and DRAM may be realized to interface by a same interface. However, example embodiments are not limited to the PRAM and DRAM sharing the same interface. It is possible to reduce a booting time, an application launch time, and hibernation on/off time of the computing system using a non-volatile XIP memory characteristic of the PRAM. This enables power consumption of the computing system 10 to be reduced.

The south bridge 400 may be connected with the north bridge 200 and be a hardware or software module used to connect constituent elements or peripheral devices requiring low transfer speed and system performance.

The storage device 500 may be connected with the south bridge 400 and store user data. OS and application programs of the computing system 10 may be installed at the storage device 500. That is, the storage device 500 may store OS boot code/data or application code/data.

The storage device 500 may be formed of a flash memory storage device, Hard Disk Drive (HDD), Solid State Drive (SSD), or the like.

A conventional computing system reads or writes OS boot code/data from or in a storage device via a south bridge interface (for example, PATA, SATA, etc.) at a booting operation. But, the computing system 10 according to example embodiments may execute OS boot code/data in place of a main memory layer (L3 memory). Accordingly, example embodiments may reduce a booting time.

Figure 2:
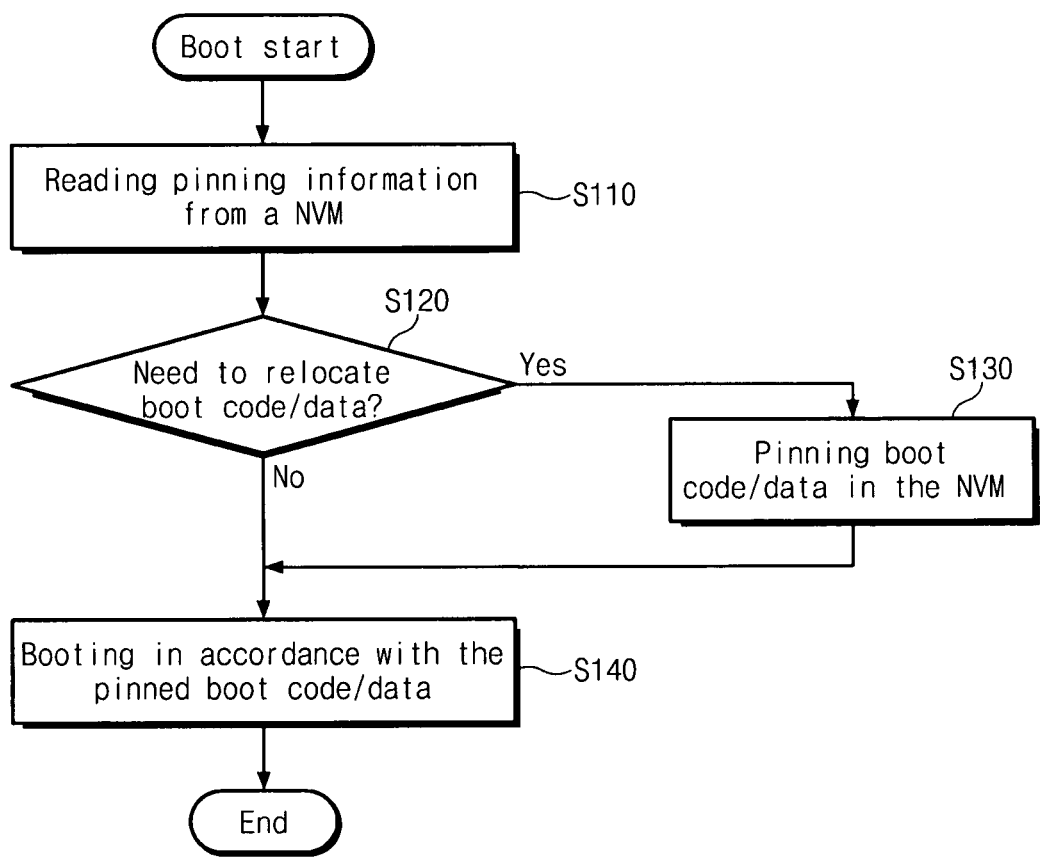
FIG. 2 is a flowchart showing a booting method of a computing system illustrated in FIG. 1.

FIG. 2 is a flowchart showing a booting method of the computing system illustrated in FIG. 1. A booting method of a computing system according to example embodiments will be more fully described with reference to FIGS. 1 and 2.

When the computing system 10 is powered, in operation S110, a boot loader may read pinning information from a pinning information area 342 of a non-volatile memory 340. The boot loader may indicate a software module for loading boot code/data for a booting operation on a main memory 300. Thus, it is possible to confirm whether any boot code/data is loaded and pinned onto a boot code/data area 344.

In operation S120, the boot loader may judge whether relocation for new loot code/data is required. If boot code/data to be relocated exists, in operation S130, the boot loader may pin the boot code/data to be relocated according to a boot code/data pinning manner, which will be more fully described with reference to FIG. 3. Afterwards, the procedure goes to operation S140. If no boot code/data to be relocated exists, the boot loader proceeds to operation S140. In operation S140, a booting operation may be carried out according to boot code/data pinned to the boot code/data area 344. Afterwards, the booting operation of the computing system 10 may be terminated.

Figure 3:
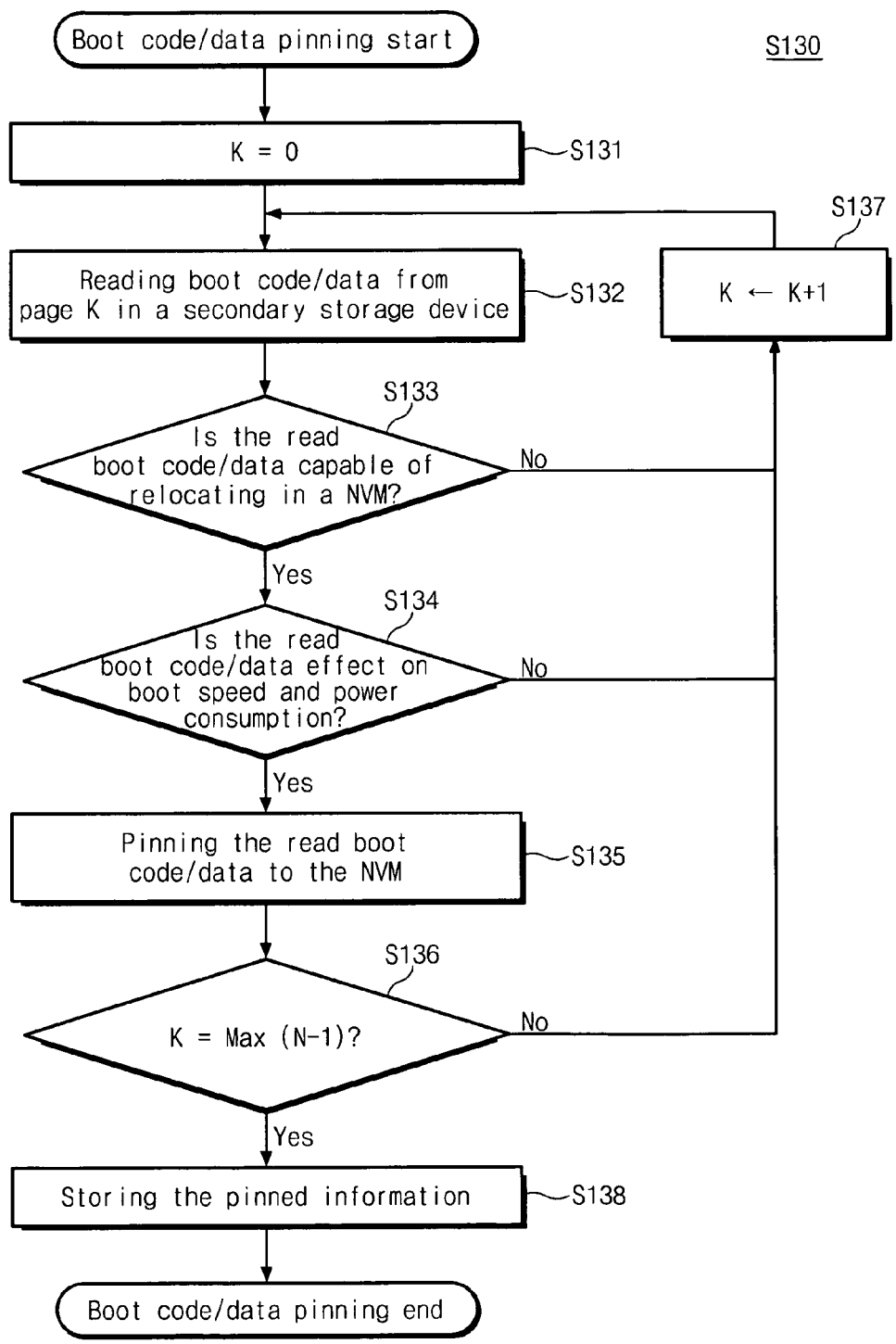
FIG. 3 is a flowchart showing a boot code/data pinning method illustrated in FIG. 2.
Figure 4:
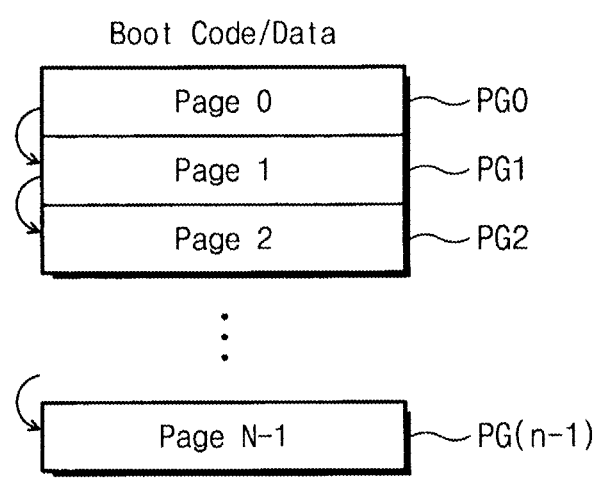
FIG. 4 is a diagram showing an embodiment of boot code/data stored in a storage device.

FIG. 3 is a flowchart showing a boot code/data pinning method illustrated in FIG. 2, and FIG. 4 is a diagram showing an embodiment of boot code/data stored in a storage device. For ease of description, it is assumed that boot code/data is stored in N pages (N being an integer), as illustrated in FIG. 4. Below, a boot code/data pinning method will be more fully described with reference to FIGS. 1 to 4.

Before accessing a storage device 500 to boot the OS, a boot loader may search whether any OS boot code/data is pinned, based on the pinning information area 342 of a non-volatile memory 340. The boot loader may be designed to access the storage device 500 with respect to the OS boot code/data which is not pinned to a boot code/data area 344 of the non-volatile memory 340.

In operation S131, a value of a variable K is set to zero. When a pinning operation for boot code or data stored in the storage device 500 is required, the boot loader may read boot code/data from the first page PG0 of a storage device 500 in operation S132. In operation S133, the boot loader may judge whether it is possible relocate the read boot code/data at the non-volatile memory 340. If it not possible to relocate the read boot code/data, the boot loader proceeds to operation S137, in which a value of K increases by 1. Afterwards, the above-described read operation for a next page may be carried out in operation S132.

If it is possible relocate the read boot code/data, in operation S134, the boot loader may judge whether the read boot code/data generally affects a booting speed and power consumption. If not, the boot loader proceeds to operation S137, in which a value of K increases by 1. Afterwards, the above-described read operation for a next page may be carried out in operation S132.

If the read boot code/data is determined to generally affect the booting speed and power consumption, in operation S135, the boot loader may pin the read boot code/data to the boot code/data of the non-volatile memory 340. For example, a page corresponding to the read boot code/data may be relocated in the non-volatile memory 340.

Afterwards, in operation S136, the boot loader may judge whether a page related to the pinning operation is a maximum page. For example, the boot loader may judge whether K=N−1. If not, the boot loader proceeds to the operation S137. If so, in operation S138, the boot loader may store pinned information in the pinning information area 342. Such pinned information may include whether any boot code/data is newly pinned and whether the pinned boot code/data is stored at any address. Afterwards, the pinning operation may be terminated.

Figure 5:
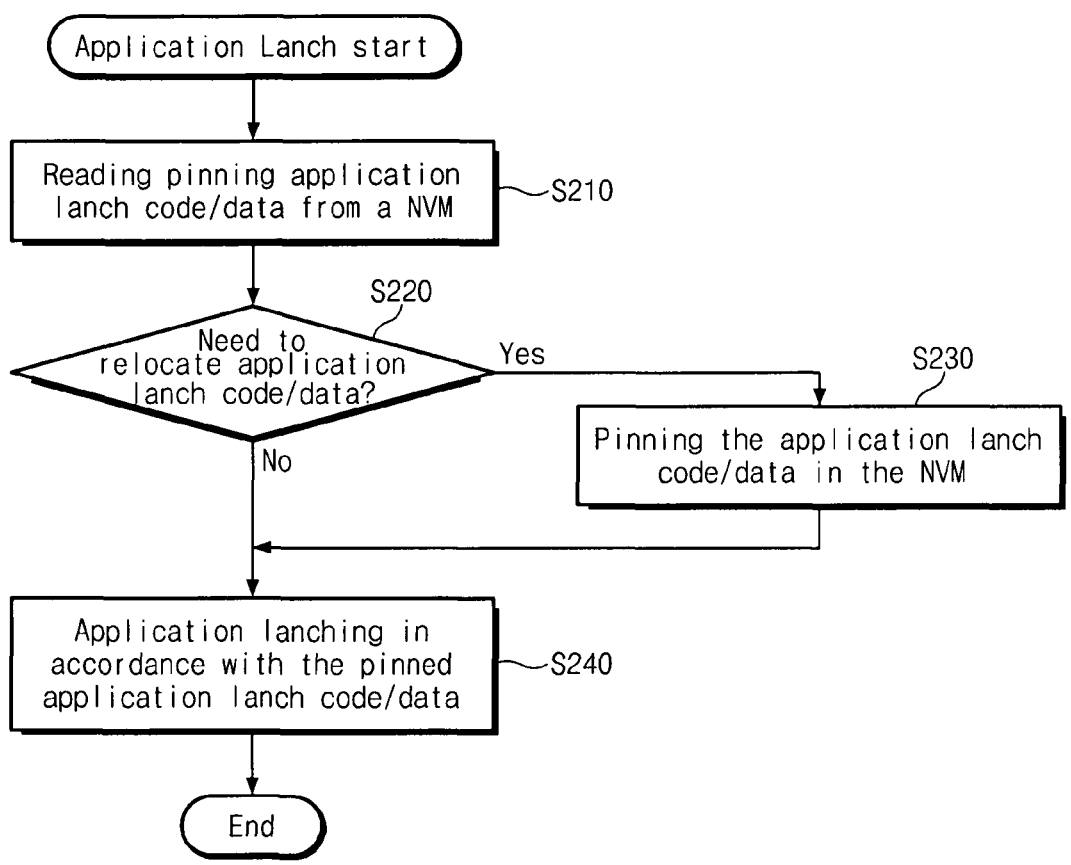
FIG. 5 is a flowchart showing an application launch method of a computing system according to example embodiments.

FIG. 5 is a flowchart showing an application launch method of a computing system according to example embodiments.

In operation S210, an application loader may read pinning information from a pinning information area 342 of a non-volatile memory 340. The application loader may be a software module for loading code/date for performing an application program onto a main memory 300. Thus, it is possible to judge whether any application code/data is loaded and pinned at an application code/data area 346 of the non-volatile memory 340.

In operation S220, the application loader may judge whether relocation for new application code/data is required. In the event that relocation for new application code/data is required, in operation S230, the application loader may pin the code/data to be relocated according to an application code/data pinning method. This will be more fully with reference to FIG. 6.

Next, in operation S240, an application launch operation may be carried out according to application code/data pinned to an application code/data area 346. In the event that no relocation for new application code/data is required in operation S220, an application launch operation may be performed according to application code/data pinned to the application code/data area 346 in operation S240. Thus, an application launch operation of a computer system 10 may be completed.

Figure 6:
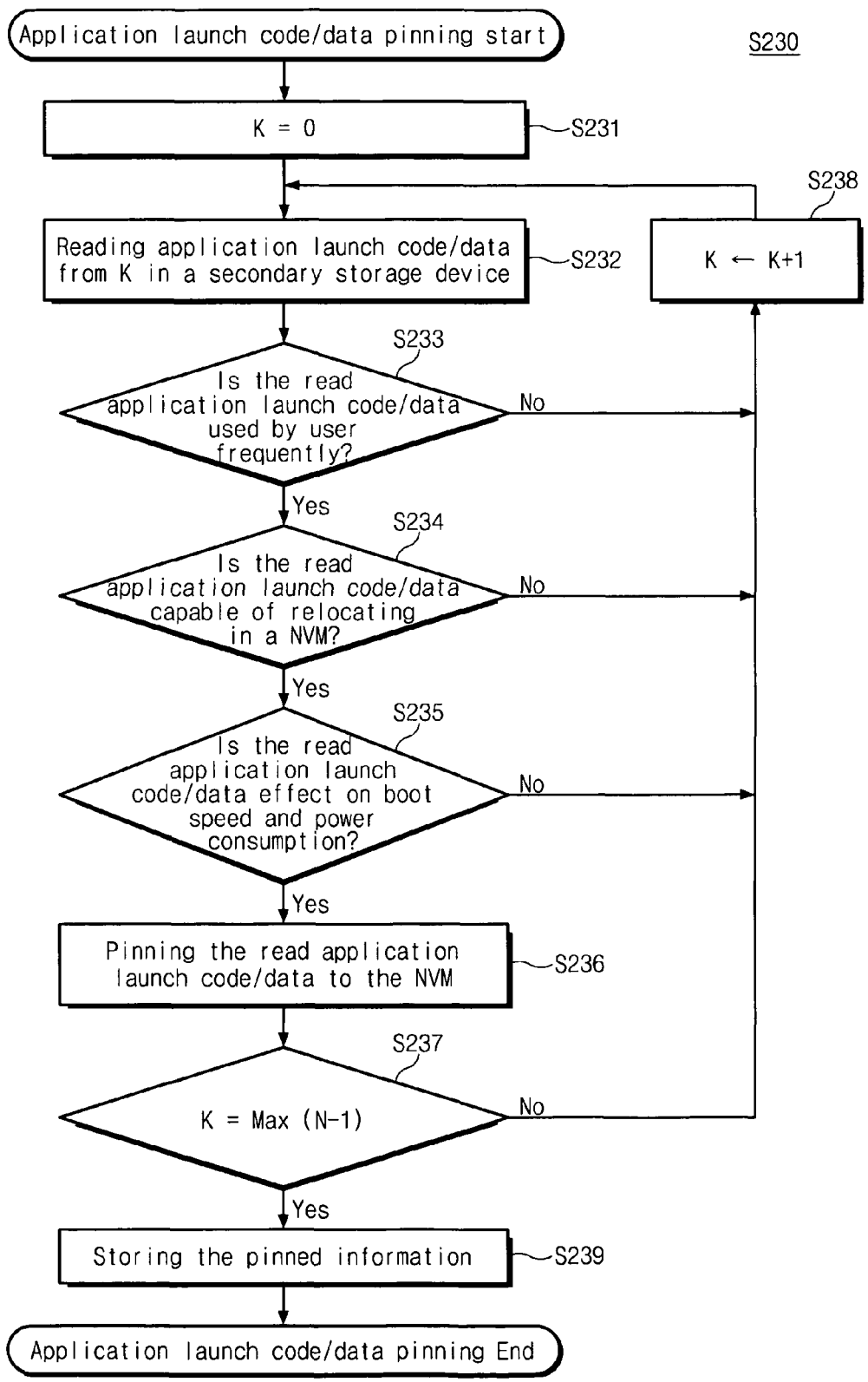
FIG. 6 is a flowchart showing an application launch code/data pinning method illustrated in FIG. 5.
Figure 7:
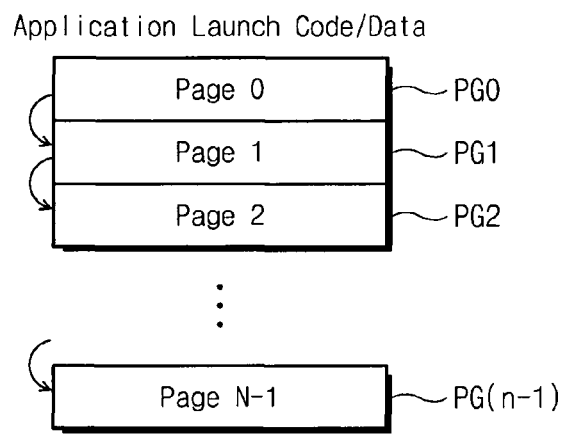
FIG. 7 is a diagram showing an embodiment of application launch code/data stored in a storage device.

FIG. 6 is a flowchart showing an application launch code/data pinning method illustrated in FIG. 5, and FIG. 7 is a diagram showing an embodiment of application launch code/data stored in a storage device. Below, an application code/data pinning method according to example embodiments will be more fully described with reference to FIGS. 1, 5, and 6.

Before reading application code/data from a storage device 500 at an application program operation, an application loader of an operating system may judge whether application code/data is pinned, based on a pinning information area 342 of a non-volatile memory 340. The application loader may be designed to access the storage device 500 with respect to application code/data which is not pinned to an application code/data area 346 of a non-volatile memory 340.

As illustrated in FIG. 6, in operation S231, a value of a variable K is set to zero. When there is required a pinning operation for application code or data stored in a storage device 500, in operation S232, an application loader may read application launch code/data from a $K^{th}$ page of the storage device 500. For example, the application loader may read application launch code/data from a first page PG0 of the storage device 500.

In operation S233, the application loader may judge whether the read application launch code/data is data frequently used by a user. If not, the application loader goes to operation S238, in which a value of K increases by 1. Afterwards, the application loader proceeds to operation S232, where a read operation may be performed with respect to a next page.

If the read application launch code/data is judged to be data frequently used by a user, in operation S234, the application loader may judge whether the read application code/data is capable of being relocated to the non-volatile memory 340. If not, the application loader goes to operation S238, in which a value of K increases by 1. Afterwards, the application loader proceeds to operation S232, where a read operation may be performed with respect to a next page.

If it is possible to relocate the read application code/data, in operation S235, the application loader may judge whether the read application launch code/data generally affects application launch speed and power consumption. If the read application launch code/data is judged not to generally affect application launch speed and power consumption, the application loader goes to operation S238 to perform a read operation with respect to a next page. Afterwards, the application loader proceeds to operation S232, where a read operation may be performed with respect to a next page.

If the read application launch code/data is judged to affect application launch speed and power consumption much, in operation S236, the application loader may pin the read application launch code/data to the application code/data area 346 of the non-volatile memory 340. In operation S237, the application loader may judge whether a page corresponding to the read application launch code/data is a maximum page. If a page corresponding to the read application launch code/data is judged not to be a maximum page, the application loader goes to operation S238. Afterwards, the application loader proceeds to operation S232, where a read operation may be performed with respect to a next page.

If a page corresponding to the read application launch code/data is judged to be a maximum page, in operation S239, the application loader may store pinned information in a pinning information area 342. Afterwards, the application launch code/data pinning operation may be completed.

Figure 8:
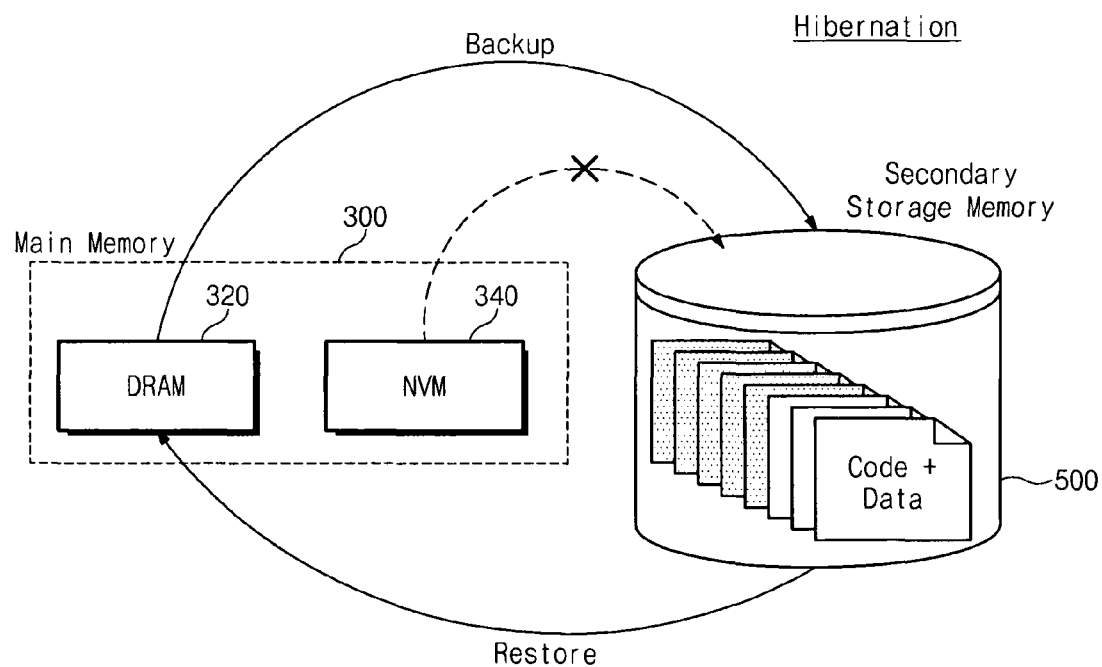
FIG. 8 is a diagram showing a hibernation operation of a computing system according to example embodiments.

FIG. 8 is a diagram showing a hibernation operation of a computing system according to example embodiments.

Hibernation is a power management technique for storing working data at a space of a storage device simultaneously when a power of a computing system 10 is off. With the hibernation, a system is maintained at a max or increased power saving mode without closing applications or windows, and a previously performed operation is restarted rapidly.

A computing system 10 may use data stored in a main memory 300 during an operation. For example, the computing system 10 may operate using data stored in DRAM 320 and a non-volatile memory 340. The computing system 10 may back up data in the DRAM 320 in a storage device 500 at a hibernation operation. It is unnecessary to back up data in the non-volatile memory 340. For this reason, at recovery, data backed up in the storage device 500 may be loaded on the DRAM 320. Since the amount of data to be backed up is reduced, a hibernation on/off time of the computing system 10 is shortened.

As described above, the computing system 10 may include a hybrid main memory which is formed of DRAM and a non-volatile memory. The non-volatile memory is capable of retaining stored code/data and is an XIP memory.

The computing system 10 may include an OS boot loader which is used to load OS code/data in the storage device 500 onto the non-volatile memory 340 by software. Since the OS boot loader is capable of recognizing code/data pinned to the non-volatile memory 340, a number of accesses to the storage device 500 is reduced at a booting or hibernation operation.

The computing system 10 may be realized to set/change XIP code/data pinned to a specific area of the non-volatile memory 340 by software. The computing system 10 may be realized to dynamically select pinned code/data to be stored in the non-volatile memory 340 by software to reduce an access number to the storage device 500. In the event that the computing system according to example embodiments is applied to a portable computer, since it is possible to reduce booting time and hibernation on/off time, the portable computer is powered by a battery during a relatively longer time.

Figure 9:
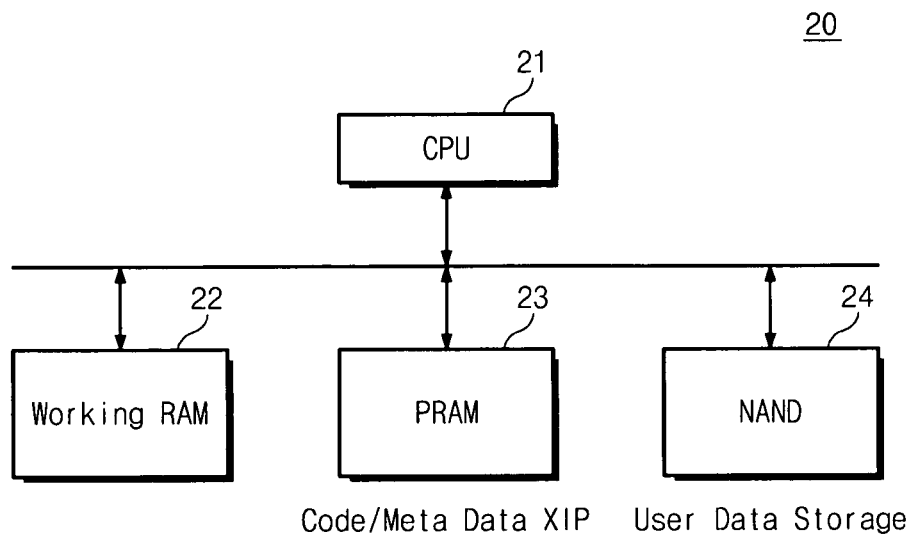
FIG. 9 is a diagram showing a memory system according to example embodiments.

FIG. 9 is a diagram showing a memory system according to example embodiments.

Referring to FIG. 9, a memory system may include a CPU 21, a wording RAM 22, a PRAM 23, and a NAND flash memory 24. The PRAM 23 may store code/meta data capable of performing an XIP function.

The CPU 21 may control an overall operation of the memory system. The working RAM 22 may temporarily store data required at an operation of the CPU 21. The working RAM may be formed of a volatile memory such as DRAM, SRAM, M-SDRAM, or the like.

The PRAM 23 may be used to pin system boot code/data of the memory system 20, meta data of the NAND flash memory 23, and the like. A booting operation may be carried out according to the pinned boot code/data. The NAND flash memory 23 may be controlled according to the pinned meta data. The pinned code/data to the PRAM 23 may be executed in place on the memory system 20.

The NAND flash memory 23 may include at least one or more NAND flash memories (not shown). The NAND flash memory 23 may be used to store user data.

A storage device or a memory system according to example embodiments may be used as a portable storage device of an MP3 player, digital camera, PDA, e-Book, and the like. Further, the storage device or the memory system may be used as a storage device for a digital TV or a computer.

A storage device or a memory system according to example embodiments may be packed by various packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The above-disclosed subject matter is to be considered illustrative, and not restrictive, and the appended claims are intended to cover all such modifications, enhancements, and other embodiments, which fall within the true spirit and scope of example embodiments. Thus, to the maximum extent allowed by law, the scope is to be determined by the broadest permissible interpretation of the following claims and their equivalents, and shall not be restricted or limited by the foregoing detailed description.

What is claimed is:

1. A booting method of a computing system including a main memory and a north bridge connected to the main memory and configured to control the main memory, comprising:

determining whether boot data of an operating system is pinned to the main memory;

determining whether new boot data to be relocated exists;

reading the new boot data from a storage device, if the new boot data is determined to exist;

determining whether the read boot data affects operating speed and power consumption of an operating system, if the read boot data is determined to be relocatable;

if the read boot data is determined to affect the operating speed and power consumption of the operating system pinning the read boot data to a main memory;

performing a booting operation using the pinned read boot data; and if the read boot data is not determined to affect the operating speed and power consumption of the operating system, not pinning the read boot data to a main memory, wherein the main memory includes a hybrid main memory which is formed of a volatile memory for storing data used for the operating system and a non-volatile memory for pinning the read boot data, wherein the volatile memory and the non-volatile memory interface with the north bridge through a same interface, wherein the non-volatile memory includes a pinning information area, a boot code/data area, and an application code/data area, wherein the boot code/data area is an area for pinning the boot data, wherein the application code/data area is an area for pinning an application data, wherein the pinning information area is an area for informing XIP (eXecute In-Place) information pinned to the non-volatile memory, wherein the XIP information includes information indicating whether the boot data is pinned to an address corresponding to the boot code/data area or whether application data is pinned to an address corresponding to the application code/data area.

2. The booting method of claim 1, wherein the main memory performs an eXecute In-Place (XIP) function.

3. The booting method of claim 2, wherein the main memory includes a RAM that temporarily stores data needed at an operation of the computing system.

4. The booting method of claim 1, wherein the reading the boot data from the storage device comprises:
reading boot data from the storage device; and
determining whether the read boot data is data to be pinned.

5. The booting method of claim 4, wherein the determining whether the read boot data is data to be pinned is based on at least whether the read boot data is already pinned to the main memory.

6. The booting method of claim 1, wherein the reading the boot data includes storing the pinned boot data in the main memory.

7. A code data pinning method of a computing system including a main memory and a north bridge connected to the main memory and configured to control the main memory, comprising:
reading boot data stored in a storage device;
determining whether the read boot data is relocatable;
determining whether the read boot data affects operating speed and power consumption of an operating system, if the read boot data is determined to be relocatable;
if the read boot data is determined to affect the operating speed and power consumption of the operating system, pinning the read boot data to a main memory; and
if the read boot data is not determined to affect the operating speed and power consumption of the operating system,
not pinning the read boot data to a main memory,
wherein the main memory includes a hybrid main memory which is formed of a volatile memory for storing data used for the operating system and a non-volatile memory for pinning the read boot data,
wherein the volatile memory and the non-volatile memory interface with the north bridge through a same interface,
wherein the non-volatile memory includes a pinning information area, a boot code/data area, and an application code/data area,
wherein the boot code/data area is an area for pinning the boot data,
wherein the application code/data area is an area for pinning an application data,
wherein the pinning information area is an area for informing XIP (eXecute In-Place) information pinned to the non-volatile memory,
wherein the XIP information includes information indicating whether the boot data is pinned to an address corresponding to the boot code/data area or whether application data is pinned to an address corresponding to the application code/data area.

8. The booting method of claim 7, wherein the main memory performs an eXecute In-Place (XIP) function.

9. The booting method of claim 8, wherein the main memory includes a RAM that temporarily stores data needed at an operation of the computing system.

10. The booting method of claim 7, wherein the reading the code data stored in the storage device reads code data that is not already pinned to the main memory.

11. A computing system comprising:
a Central Processing Unit (CPU);
a north bridge configured to connect the CPU with one or more devices directly accessing the CPU;
a main memory connected with the north bridge and configured to store data used for an operation of the CPU;
a south bridge connected with the north bridge and configured to connect with one or more devices indirectly accessing the CPU; and
a storage device connected with the south bridge and configured to store user data and code data,
wherein the main memory includes a non-volatile memory to which the code data stored in the storage device is pinned and to which the pinned code data is executed in place of the code data stored in the storage device,
wherein the main memory is a hybrid main memory which includes a volatile memory for storing data used for the operating system and the non-volatile memory,
wherein the volatile memory and the non-volatile memory are configured to interface with the north bridge through a same interface,
wherein the non-volatile memory includes a pinning information area, a boot code/data area, and an application code/data area,
wherein the computing system is configured such that the boot code/data area is an area for pinning boot data, the boot data being boot code of an operating system of the computing system,
wherein the computing system is configured such that the application code/data area is an area for pinning an application data,
wherein the computing system is configured such that the pinning information area is an area for informing XIP (eXecute In-Place) information pinned to the non-volatile memory,
wherein the XIP information includes information indicating whether the boot data is pinned to an address corresponding to the boot code/data area or whether application data is pinned to an address corresponding to the application code/data area, and
wherein the computing system is configured such that,
the computing system determines whether new boot data read by the computing system affects an operating speed and power consumption of the operating system, if the read boot data is determined to be relocatable;
if the read boot data is determined to affect the operating speed and power consumption of the operating system,
the computing system pins the read boot data to a main memory; and
the computing system performs a booting operation using the pinned read boot data; and
if the read boot data is not determined to affect the operating speed and power consumption of the operating system, the computing system does not pin the read boot data to a main memory.

12. The computing system of claim 11, wherein,
the non-volatile memory includes Phase-change Random Access Memory (PRAM), and
the main memory further includes Dynamic Random Access Memory (DRAM) for temporarily storing data.

13. The computing system of claim 12, wherein the PRAM and the DRAM are configured to share a same interface.

14. The computing system of claim 13, wherein data in the DRAM is backed up in the storage device and the backed-up data is recovered for a hibernation operation of the computing system.

15. The computing system of claim 14, wherein no data in the PRAM is backed up in the storage device for the hibernation operation of the computing system.

* * * * *